APPARATUS FOR RECORDING VIDEO AND AUDIO SIGNALS WITH MEANS FOR FACILITATING SYNCHRONOUS CUTTING

Original Filed June 5, 1962

INVENTOR
FRANCISCUS TH. BACKERS
JOHANNES H. WESSELS.
BY
AGENT

United States Patent Office 3,432,614
Patented Mar. 11, 1969

3,432,614

APPARATUS FOR RECORDING VIDEO AND AUDIO SIGNALS WITH MEANS FOR FACILITATING SYNCHRONOUS CUTTING

Franciscus Theodorus Backers and Johannes Hendrik Wessels, Emmasingel, Eindhoven, Netherlands, assignors to North American Philips Company, Inc., New York, N.Y., a corporation of Delaware Continuation of application Ser. No. 200,153, June 5, 1962. This application May 17, 1967, Ser. No. 639,247
Claims priority, application Netherlands, June 15, 1961, 266,006
U.S. Cl. 178—6.6 3 Claims
Int. Cl. H04n 5/76, 5/78

ABSTRACT OF THE DISCLOSURE

A rotating helically scanning video head is provided within a stationary drum having a recording tape wrapped around it. A stationary audio head is positioned on the drum with respect to the tape and rotating head such that the time differential along the tape length between the recorded video signal and the recorded audio signal is imperceptibly small, of the order of 0.1 second.

Figure 1:
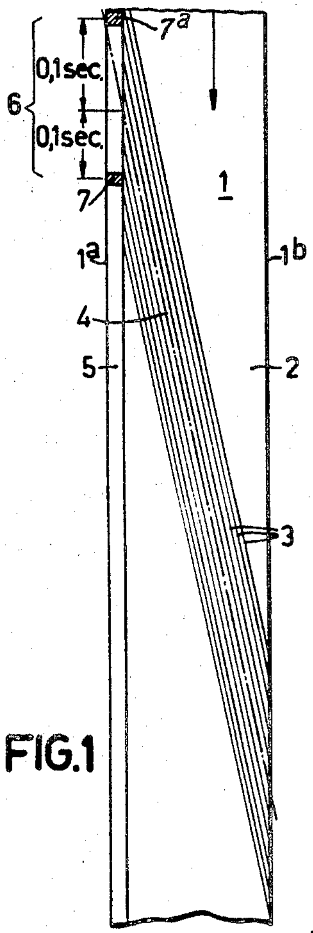

This application is a continuation of application Ser. No. 200,153, filed June 5, 1962, by Franciscus T. Backers and Johannes H. Wessels.

This invention relates to an apparatus for recording and/or reproducing high-frequency signals, in particular video signals. It is particularly concerned with such apparatus wherein at least one magnetic head rotates in a slot of a stationary drum in a plane at right angles to the drum axis and coacts with a magnetic tape helically wound with a full or partial turn on the drum. Such apparatus generally includes at least one additional magnetic head (for example an audio head) for recording or reproducing signals in a track extending in the longitudinal direction of the tape. In known apparatus of this kind the audio head is arranged at a point along the tape at some distance from the drum. This means that a sound passage associated with a certain video recording is recorded on the tape at a point preceding or succeeding it by a comparatively large distance. When cuts have to be made in a tape on which signals have been recorded by such apparatus, due to the inferior quality of part or parts of the video recording, the sound associated with a video recording of satisfactory quality is lost, while the sound passage associated with the image recording of inferior quality is retained; the cuts generally extend from edge to edge on a line parallel to a video line. In addition, when the tape has to be divided by cutting, one part no longer contains the sound passage associated with the final video recording; this sound passage is retained on the other part where the associated image is missing.

In order to obviate this disadvantage, in accordance with one aspect of the invention the audio head is arranged at a distance from the video head such that the corresponding time difference between a particular sound passage and its associated image is imperceptibly small (for example 0.1 sec.). The term "distance" is here to be understood to mean the distance measured along the sound track from the point at which a certain sound passage is recorded to a point of the sound track at which a cut through the associated video passage would be made, while excluding the case in which the distance between the point of a sound passage and the point at which the associated video line reaches the sound track is zero; in the latter case the audio head would lie in the plane in which the video head rotates and this is manifestly not possible. In the arrangement according to the invention, a particular sound passage and the associated video recording are physically near one another on the tape so that cuts can be made with less possibility of asynchronism between sound and video; the distance chosen provides a degree of freedom enabling the audio head to be disposed on, or immediately in front of, the drum.

The invention is based on the recognition that, in the case of a distance between the video and audio heads corresponding to a time difference of 0.1 sec., the sound precedes by 0.1 sec. the sound passage actually associated with the first image passage of the cut tape or the sound passage associated with a certain image passage is lacking for 0.1 sec. but that this period of time is imperceptibly small. If the tape is driven at a speed of 38 cm./s., the audio head records or reproduces the associated sound passage at a point of the tape spaced by a distance of 3.8 cms. from the point at which a line of the video track touches the audio track. This allows the audio head to be located at a point on, or outside of, the drum without excessive difficulty. However, if contrary to the normal procedure of cutting from edge to edge along a line of the video track, a cut is made which both at the beginning and at the end of a video line 3½% thereof are lost by making the cut at right angles to the longitudinal direction of the tape and following the video line for the remaining 93% (this method will be described in detail hereinafter with reference to the drawings) with a length of the lines of 1 m. another distance of about 3½ cms. corresponding to a time difference of 0.1 sec. may be gained; this allows the audio head to be located within the drum at a distance of at most about 7 cms. In making such a three-part cut a loss of image information of 7% has to be accepted, but this is admissible.

In a preferred embodiment of the apparatus in accordance with the invention, the audio head is located at a point along the circumference of the drum which is covered by the tape; this facilitates the making of a three-part cut.

Figure 2:
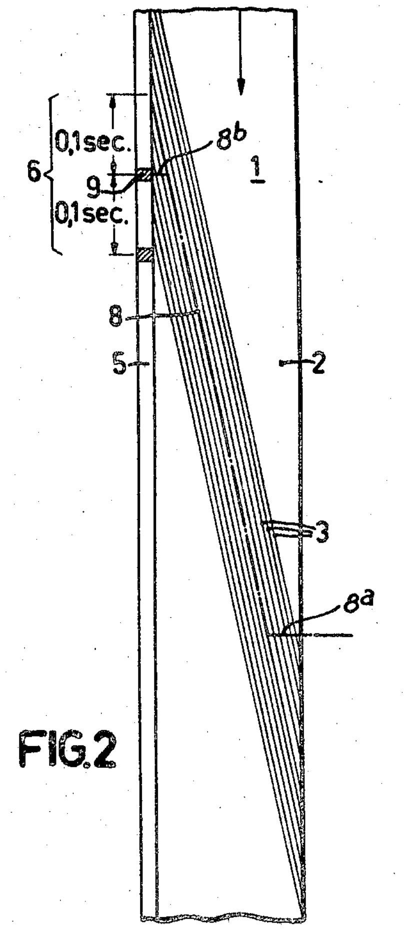
Figure 3:
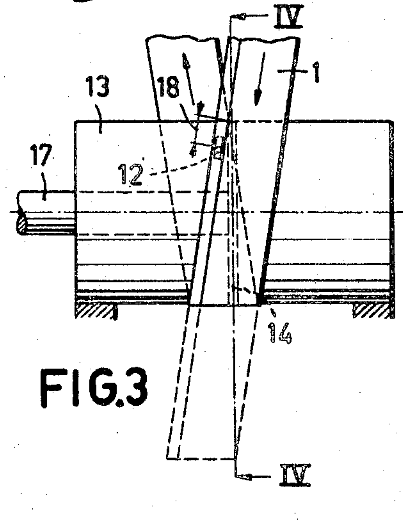
Figure 4:
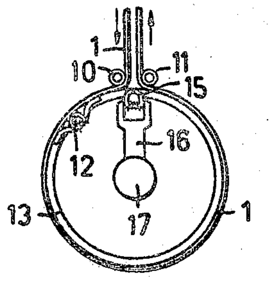

In order that the invention may readily be carried into effect, an embodiment thereof will now be described, by way of example, with reference to the accompanying diagrammatic drawings, in which:

FIGURES 1 and 2 each show schematically a magnetic tape with video tracks thereon in which a cut is made along a dot-dash line;

FIGURE 3 shows an apparatus for recording and reproducing video signals, the audio head being disposed in accordance with the invention at the circumference of the drum; and FIGURE 4 is a sectional view of the apparatus shown in FIGURE 3 taken along a line IV—IV.

In FIGURE 1 a video track is shown as recorded in the form of long oblique lines 3 on a section 2 of a magnetic tape 1. Each line contains 312½ video lines and is recorded in $\frac{1}{50}$ sec. For the sake of clarity, only the lines containing the odd lines of the image frame are shown; the lines containing the even lines of the image frame are not shown but each of these may be considered as extending between a pair of the lines shown. One of the lines (4) represents a line along which a cut is to be made.

A section 5 for the audio track lies beside the section 2 for the video track. The shaded extreme areas 7 and 7*a*, in a zone 6 of section 5 indicate the points spaced from the sound passage associated with the image recording in the line 4 by distances corresponding to a time difference of 0.1 sec. and hence, according to the invention, the maximum distance by which the audio and video heads may be spaced from one another. Thus, if after completion of a recording the tape is divided into two parts 1*a* and 1*b* by a cut along the line 4 and the part 1*a* is reproduced, if the sound associated with the line 4 is recorded in the area 7 of the zone 6, the sound will initially lead the reproduced image by 0.1 sec., and this is imperceptible in practice. At the end of this period of 0.1 sec. the sound is again in phase or synchronous with the image.

FIGURE 2 shows a cut made along a dot-dash line 8. Such a cut is preferred because the tape parts on either side of the cut made according to FIGURE 1 terminate in long narrow points: length of a line about 1 meter, with a drum diameter of 30 cms. and a tape width of 2″. These points are difficult to handle in practice; this may be blunted by making a cut whose start 8*a* and end 8*b* extend at right angles to the longitudinal direction of the tape each for about 3½ cms. In this manner with a line length of 1 meter about 7% of the video information is lost; however, this is permissible because this percentage falls within the black region of the image. With a tape speed of 38 cms./s. these 3½ cms. correspond to about 0.1 sec.; therefore, if the audio head is located with respect to the video head so that the sound passage associated with the line 8 is recorded in an area 9 of an audio track 5, after cutting and splicing there is no time difference between image and sound, although the audio head is displaced about 3½ cms. with respect to the video head. Each part of the divided tape contains the sound passages associated with the video images recorded on it. As an actual time difference of at most 0.1 sec. is permissible, the audio head and the video head may be spaced from each other by another 3.5 cms. resulting in an overall spacing of 7.0 cms. which frequently is sufficient for the audio head to be located within the drum.

FIGURES 3 and 4 show an arrangement in which an audio head 12 is located on the inside of the outer surface of a stationary drum 13. A video head 15 is mounted in a slit 14 on an arm 16 capable of rotation about a shaft 17.

The problem of cutting and consequent asynchronism is met with not only in the correlation of audio and video signals but also in the orientation of the cue- or sync-signals. The solution given above with respect to the location of the audio head may also be used for the location of the cue or sync recording or reproducing head.

While the invention has been described with respect to specific embodiments, various changes and modifications will readily occur to those skilled in the art within the purview of the appended claims. It is also to be noted that all quantitative values are given for illustrative purposes only. For example, the invention is of course equally suitable for an arrangement where each line on the tape contains 262½ video lines.

We claim:

1. Apparaus for transducing video and audio signals on a magnetic tape in a manner to facilitate synchronous cutting of the taape, comprising: a stationary drum having a slot therein separating said drum into two coaxial portions of the same diameter, a magnetic head rotating in said slot in a plane at right angle to the drum axis, a magnetic tape helically wound on said drum, means for driving said tape around said drum, and an additional magnetic head co-acting with said tape, said additional head being stationary and located on a part of the circumference of the drum which is covered by the tape and being spaced from said rotating head at the time that the rotating head starts transducing at an edge of the tape by a distance such that the travel time of said edge between said rotating head and said stationary head from said transducing starting time is of the order of 0.1 second, said travel time corresponding to the time difference between the audio signal transduced by the additional head and the video signal picked up synchronously with the said audio signal and transduced by the rotating head, the time difference between said video and audio signals being imperceptibly small when a cut is made in the tape substantially along the length of video line.

2. Apparatus for recording video and audio signals on a magnetic tape in a manner facilitating synchronous editing of video and audio signals along a recorded video image line, comprising, a stationary drum having a slot therein separating said drum into two coaxial portions, a magnetic tape having a video portion and an audio portion, said tape being helically wound on said drum and overlying said slot, means for driving said tape around said drum, magnetic video recording head rotating in said slot in a plane orthogonal to the drum axis, said video head recording a video image line onto said tape terminating at a point on the edge of the video portion of said tape, and a stationary recording head mounted on said drum for recording the audio signal picked up synchronously with the video signal onto the audio portion of said tape at a location thereon substantially coincident with said point, the time differential between said video recording point and the location of the said audio signal being of the order of 0.1 second.

3. The method of recording video and audio signals on a magnetic tape having a video and audio portions in a manner to facilitate synchronous editing of video and audio signals along a recorded video image line, comprising the steps of recording a video image signal on said tape along a line positioned obliquely with respect to said tape, said line terminating at a point on the edge of the video portion of said tape, recording the audio signal, picked up synchronously with said video signal, onto the audio portion of said tape, cutting said video tape portion beginning along a first line at right angles to the edge of said tape, continuing along a second line coincident with said oblique video image line for a substantial portion of said tape width, and completing the cut along a third line, said third line continuing along in the direction of said first line through the edge of the video portion of said tape and on through the audio portion of said tape, said third line and said synchronous audio signal being substantially coincident.

References Cited

UNITED STATES PATENTS

| | | | |
|---|---|---|---|
| 1,910,369 | 5/1933 | Southwell | 352—37 |
| 2,773,120 | 12/1956 | Masterson | 179—100.2 |

BERNARD KONICK, *Primary Examiner.*

R. J. GOUDEAU, *Assistant Examiner.*

U.S. Cl. X.R.

179—100.2